April 11, 1950

H. T. REEVE 2,503,564

SOLDERING COMPOSITION

Filed Sept. 2, 1944

INVENTOR
H. T. REEVE
BY
O.E. Rasmussen
ATTORNEY

Patented Apr. 11, 1950

2,503,564

UNITED STATES PATENT OFFICE 2,503,564

SOLDERING COMPOSITION

Howard T. Reeve, Millburn, N. J., assignor to Bell Telephone Laboratories, Incorporated, New York, N. Y., a corporation of New York Application September 2, 1944, Serial No. 552,416

3 Claims. (Cl. 113—110)

This invention relates to soldering compositions and more particularly to compositions of this kind for use within the intermediate range of soldering temperatures, namely, between about 400° and 600° C.

It is an object of the invention to provide a soldering composition or metal free from vaporizable materials and adapted for practical soldering operations at temperatures between 400° and 600° C.

As is well known, soldering compositions or metals are generally divided into two main classes, one being adapted for soldering at temperatures below 400° C. and the other being adapted for soldering at temperatures above 600° C. For various reasons soldering compositions for use between 400 and 600° C. are rare and have not been found practical for general use.

There are, however, many instances where it is desirable to perform the soldering operation at temperatures between 400 and 600° C. One such instance is that of soldering certain metal parts together for use in various types of electron discharge tubes for electrical communication and transmission. In this particular case, the metallic parts are assembled on the central stem and placed within the glass tube; a vacuum or other desired atmosphere is established within the glass tube and for certain purposes the entire assemblage is heat treated at a temperature between 500 and 550° C. It has been found desirable to perform the soldering operation for the different joints of the metal parts during the heat treatment of the assembled tube.

For this purpose the soldering composition must have a melting point commensurate with the temperature of the heat treatment and must be composed of materials which will not contaminate the atmosphere within the tube either during the heat treatment or during the subsequent service conditions.

It is therefore a further object of the invention to provide a soldering composition or material for use within the intermediate temperature range, which will effectively solder metal parts together without producing vapors and without requiring the application of mechanical pressure to the soldering point and which therefore will be suitable for soldering of parts which are inaccessible.

It is a further object of the invention to provide a soldering composition or metal which is ductile and malleable so that it may be shaped into different convenient forms suitable for specific arrangements of the parts to be soldered.

It is a more specific object of the invention to provide a soldering composition for soldering at temperatures between 400 and 600° C. which is composed of non-vaporizable metals which may be readily formed into wires, tubes, washers or any other suitable shape for soldering.

In accordance with the invention, the soldering composition or material is comprised mainly of gold, silver, and tin in the proper proportions to form an alloy which will melt and flow between 400° and 600° C.

It has been found that alloys of these three metals within the proportions required for the intermediate soldering temperature range are too brittle to be worked into the desired shapes. Attempts to add other non-vaporizable metals with the idea of reducing the brittleness have not been successful.

It is therefore a principal feature of the invention to temporarily combine the gold, silver and tin in such a manner that the resultant soldering material will not be brittle and therefore may readily be handled or worked into any desired form; and the composition will have the three metal components so closely associated that they may be alloyed together into the final soldering alloy merely by being placed at the soldering point and raised to the soldering temperature.

More specifically the soldering material is made up of two parts which are separate, but are placed in close mutual contact, one part being a high melting point metal mainly of gold and silver and the other part being a low melting point metal mainly of tin. The two parts are so composed that they, while separated, will be both ductile and malleable and so that they will alloy and act as a solder when subjected to a soldering temperature between 400 and 600° C. while being in close mutual contact. The parts being workable they may be mechanically shaped and associated together in any desired manner. For these purposes the gold-silver part may have some tin alloyed therein and the tin part may have some gold or silver or both alloyed therewith, the limitation of these addition metals being determined by the range within which these alloys exhibit too great brittleness for the desired purposes. Referring to the International Critical Tables and particularly to the gold-tin and silver-tin diagrams on page 416 of volume 2 it appears that the resultant soldering material may include from about 85% down to probably 20% of gold, from 60% down to probably 20% of silver and the balance tin, combined into two separate parts, as indicated above, in accordance with the invention. It should be noted however that an alloy with substantial proportions of both gold and silver has a particularly low vapor pressure which makes it advantageous in vacuum tubes.

The composition may be otherwise modified to serve the general purposes of the invention. Thus copper may be substituted for part of the gold and silver in the high melting point part. Indium, thallium and lead are possible substitutes for the tin. Possible addition metals are nickel, platinum and palladium.

It is furthermore possible for the attainment of the general objects of the invention to provide a soldering material composed of one part mainly of gold, one part mainly of silver and one part mainly of tin, the three parts being formed separately and the two high melting point parts being placed in close contact with the low melting point part for alloying at the desired soldering temperature.

The invention will now be described more in detail, as an application in a preferred embodiment of its principles and features, and reference will be made to the accompanying drawing, in which.

Figure 1:
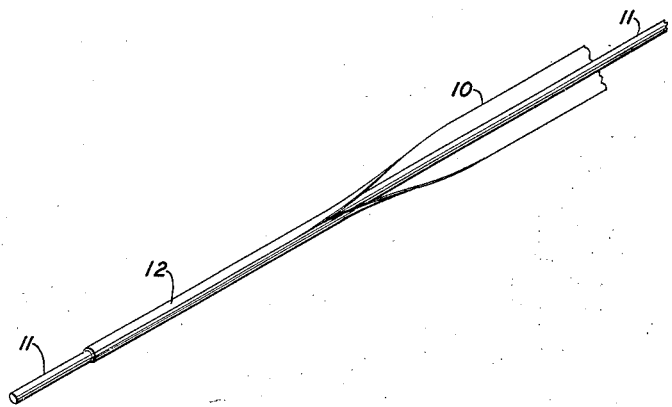
Fig. 1 shows a strand of the soldering composition.

In the preferred embodiment of the invention, as illustrated in Fig. 1 of the drawing, the soldering composition is made up of a rolled metallic strip 10 of an alloy of equal parts of gold and silver and a drawn strand or wire 11 of tin. With the proportions of metals being 30% of gold, 30% of silver and 40% of tin by weight, the melting and alloying temperature will be about 525° C., which is within the range of temperature treatment of vacuum tubes. The gold and silver strip 10 is drawn through a suitable die together with the tin wire 11 to form a tube 12 tightly enclosing the wire.

The combined tube and wire may be formed or bent in any convenient manner and applied cold to each soldering point before insertion in the glass tube; the two elements will alloy together during the heat treatment of the vacuum tube and produce a soldered joint.

Figure 2:
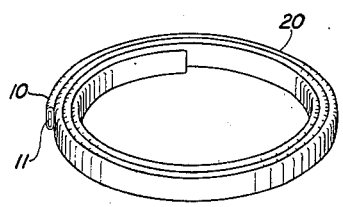
Fig. 2 shows the strand formed into a washer.

The strand may furthermore be wound in a spiral which may be compressed to form a washer 20 of any suitable size as shown in Fig. 2.

It is evident that the high melting point gold and silver element and the low melting point tin element may be combined in other manners for any given proportions to suit particular purposes. Thus the gold and silver element may be in wire form, tinned with the required amount of tin; the two elements may form units of parallel strips which may be twisted or wound in different manners; or the two elements may be comminuted, mixed and compressed into pellets, washers or any other desired shape.

For use in vacuum tubes or tubes with low pressure gases it is important not only that the main constituents of the soldering composition should be non-vaporizable at the soldering and operating temperatures and at the low pressures involved, but these constituents should be free from nearly all traces of other metals or impurities which would tend to contaminate the enclosed atmosphere in the tube under the same conditions of temperature and pressure.

What is claimed is:

1. A ductile and malleable soldering composition comprising about 30% of gold, 30% of silver, and closely adjacent to the alloyed gold and silver being alloyed together and the tin being separate and closely adjacent to the alloyed gold and silver for alloying therewith at soldering.

2. A ductile and malleable soldering material comprising about equal proportions of gold, silver and tin, the tin content being slightly larger than that of the gold and silver, the tin portion being separate from and closely adjacent to the gold and silver for alloying therewith at soldering temperatures.

3. A ductile and malleable soldering composition comprising two mutually unalloyed metallic materials in close mutual contact, one of said materials being an alloy of gold, silver and tin, having a melting point above 600° C., the other of said materials being an alloy of tin with at least one of the other said metals having a melting point below 400° C., said two materials being physically combined in proportions to establish a melting point between 400° C. and 600° C. for said composition.

HOWARD T. REEVE.

REFERENCES CITED

The following references are of record in the file of this patent:

UNITED STATES PATENTS

| Number | Name | Date |
| --- | --- | --- |
| 150623 | Shaw | May 5, 1874 |
| 1,008,845 | Meier | Nov. 14, 1911 |
| 1,248,506 | Lavine | Dec. 4, 1917 |
| 1,699,438 | Meinhardt | Jan. 15, 1929 |
| 2,189,640 | Powell | Feb. 6, 1940 |
| 2,270,594 | Leuser | Jan. 20, 1942 |
| 2,274,863 | Leuser | Mar. 3, 1942 |
| 2,340,362 | Atlee et al. | Feb. 1, 1944 |
| 2,362,893 | Durst | Nov. 14, 1944 |
| 2,398,449 | Ronci | Apr. 16, 1946 |